Oct. 24, 1961 L. E. KUNTZ 3,005,554
MEASUREMENT AND CONTROL OF B.S. AND W. IN OIL
Filed Sept. 25, 1957 3 Sheets-Sheet 1
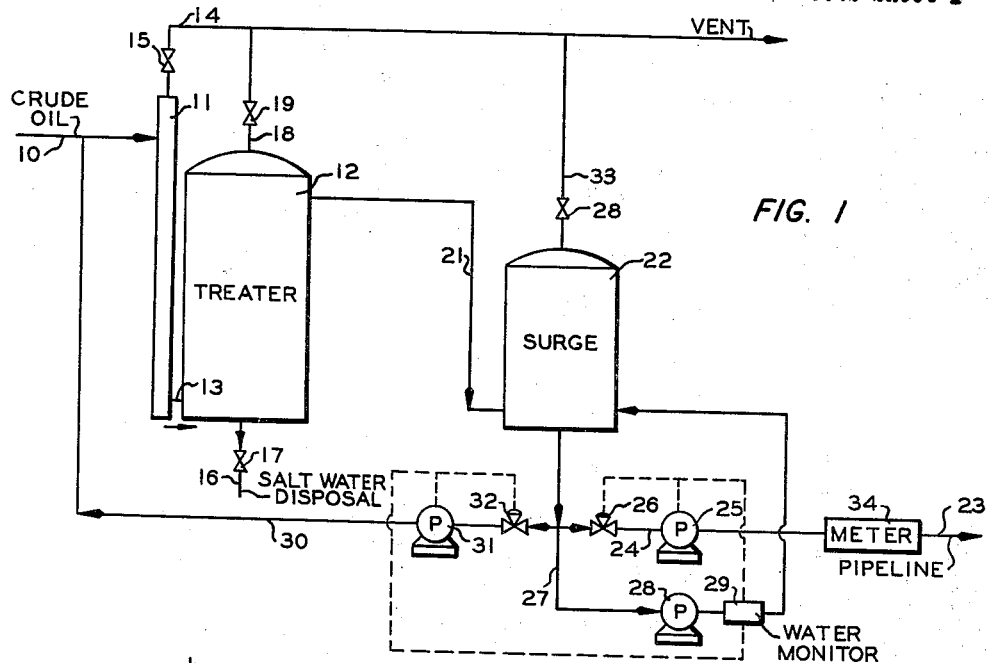
FIG. 1
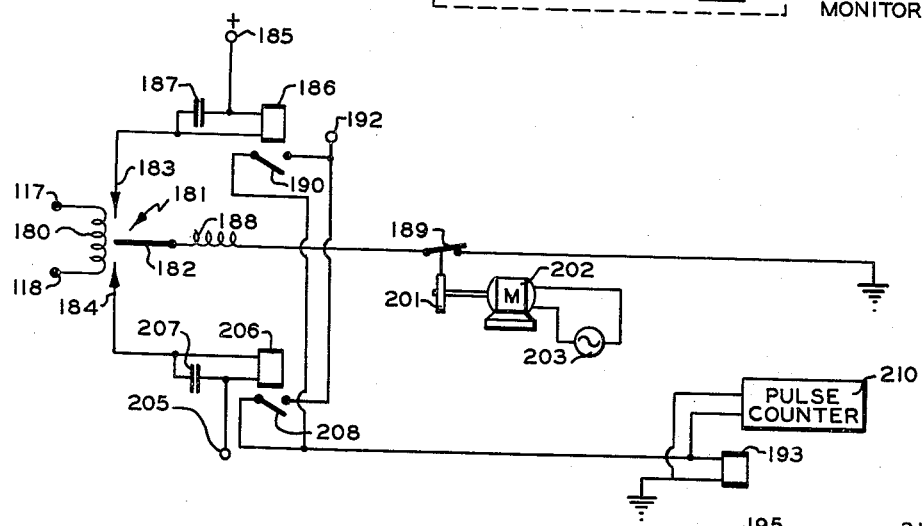
FIG. 4
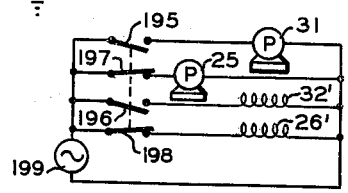
INVENTOR.
L.E. KUNTZ
BY Hudson & Young
ATTORNEYS

INVENTOR.
L.E. KUNTZ

BY Hudson & Young
ATTORNEYS

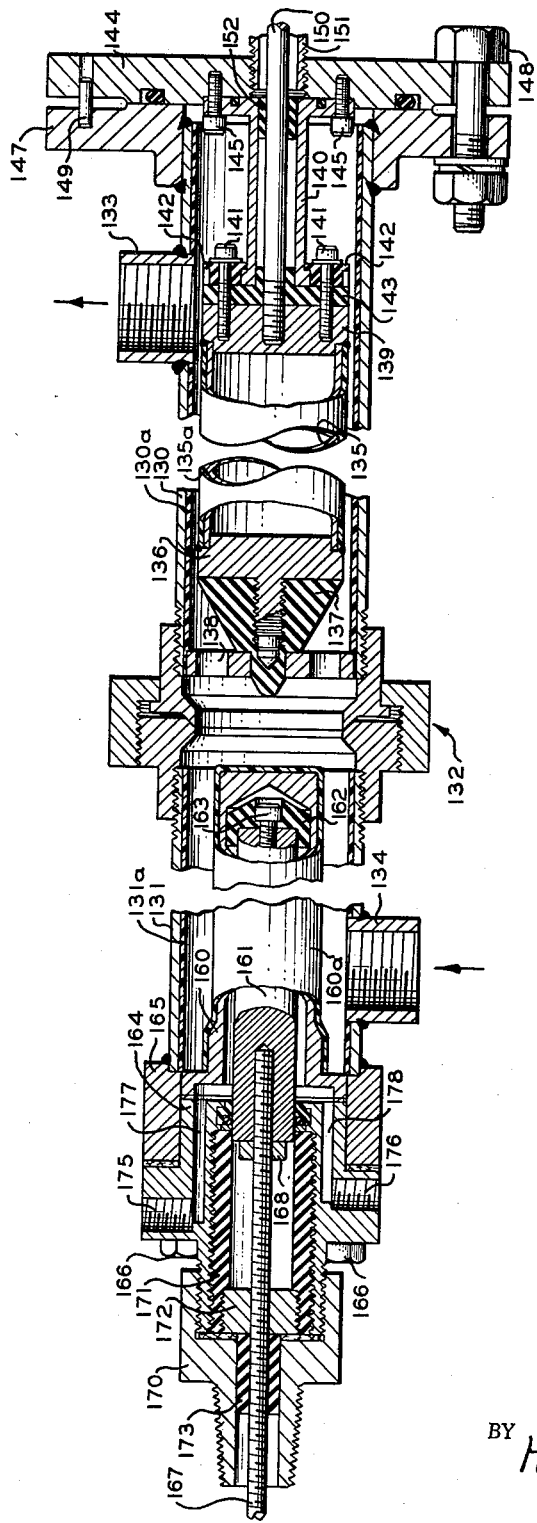

3,005,554
MEASUREMENT AND CONTROL OF
B.S. AND W. IN OIL
Louis E. Kuntz, Bartlesville, Okla., assignor to Phillips Petroleum Company, a corporation of Delaware
Filed Sept. 25, 1957, Ser. No. 686,192
9 Claims. (Cl. 210—96)

This invention relates to apparatus for measuring and/or controlling the amount of B.S. and W. (basic sediment and water) present in oil.

In the petroleum industry it is common practice to gather oil from a plurality of producing wells at a single location adjacent a pipeline. The oil is treated at this location to remove basic sediment and water, metered and transferred into the pipeline. Automatic custody transfer systems are presently being developed to carry out these operations with a minimum amount of supervision. In a gathering and transfer system of this type it is important that the B.S. and W. concentration in the oil delivered to the pipeline be maintained at less than a predetermined amount. The pipeline owner generally will not accept crude oil having a B.S. and W. concentration greater than a predetermined amount because of difficulties which may result due to the sediment and water settling out in storage tanks. Furthermore, the refiner who purshases the oil from the pipeline generally will not accept oil having B.S. and W. concentrations greater than a predetermined amount.

In accordance with the present invention, apparatus is provided which is capable of measuring continuously the amount of B.S. and W. present in crude oil to be delivered to a pipeline. This apparatus is based upon a measurement of the dielectric constant of the oil to determine the amount of B.S. and W. present therein. If the measured B.S. and W. concentration should exceed a predetermined amount, the oil is transferred to a treating unit to remove additional amounts of B.S. and W. in order to maintain the B.S. and W. concentration in the delivered oil less than a predetermined amount. Novel apparatus is provided in accordance with this invention for measuring the dielectric constant of the oil.

Accordingly, it is an object of this invention to provide improved apparatus for measuring the concentration of B.S. and W. in oil.

Another object is to provide apparatus for maintaining the concentration of B.S. and W. in oil delivered to a pipeline less than a predetermined amount.

Other objects, advantages and features of this invention should become apparent from the following detailed description which is taken in conjunction with the accompanying drawing in which:

FIGURE 1 is a schematic representation of an oil treating and measuring unit having the monitoring and control system of the present invention incorporated therein.

FIGURE 3 is a view, shown partially in section, of the capacitance measuring and temperature compensating probes employed in the apparatus of FIGURE 2.

FIGURE 4 is a schematic circuit drawing of the control system of FIGURE 1.

Figure 2:
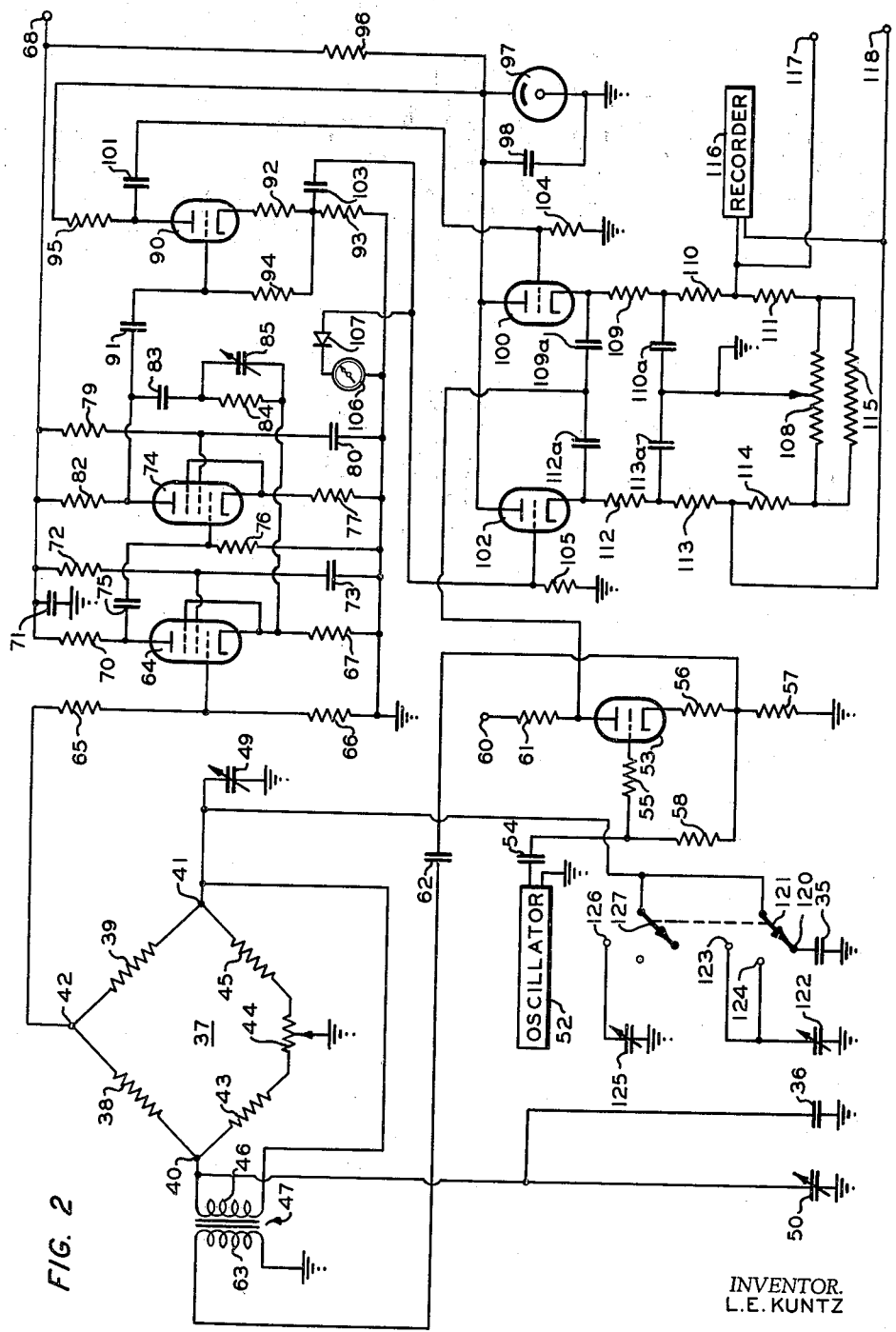
FIGURE 2 is a schematic circuit drawing of the dielectric constant measuring apparatus employed in the control system of this invention.

Referring now to the drawing in detail, and to FIGURE 1 in particular, there is shown a system for measuring and transmitting crude oil to a pipeline. The crude oil to be metered is delivered through an inlet conduit 10 which communicates with a vertical column 11. The lower region of column 11 communicates with a treater tank 12 through a conduit 13. Gases entrained in the crude oil are at least partially liberated in column 11 and are removed through a vent conduit 14 which has a valve 15 therein. Any B.S. and W. present in the crude oil tends to settle to the bottom of treater 12 and is removed therefrom through a conduit 16 which has a valve 17 therein. Treater 12 can be provided with a heating unit, not shown, to facilitate removal of B.S. and W. from the oil. Gases evolved from the oil in treater 12 are removed through a vent conduit 18 which has a valve 19 therein. The treated oil is removed from treater 12 through a conduit 21 which communicates with a surge tank 22.

The oil in tank 22 is delivered to a pipeline 23 by means of a conduit 24 which has a pump 25 and a control valve 26 therein. An oil meter 34 is also disposed in conduit 24. Any gases evolved from the oil in surge tank 22 are removed through a vent conduit 33 which has a valve 28 therein. A portion of the oil removed from surge tank 22 is directed by a conduit 27, which has a pump 28 therein, through a water monitor 29 and is returned to surge tank 22. If the B.S. and W. content of the oil exceeds a predetermined value, monitor 29 provides an output signal which closes valve 26 and stops pump 25 to terminate delivery of oil to the pipeline. A conduit 30, which has a pump 31 and a control valve 32 therein, communicates between surge tank 22 and the inlet of column 11. If the concentration of B.S. and W. in the oil circulating through monitor 29 exceeds the predetermined set value, monitor 29 also opens valve 32 and starts pump 31 to recirculate oil from surge tank 22 through treater 12. This continues until the B.S. and W. concentration in the oil to be delivered to the pipeline is again within acceptable limits.

Monitor 29 measures the B.S. and W. concentration by measuring the dielectric constant of the oil circulated through the monitor. A capacitor 35, see FIGURE 2, is disposed within the flow of oil so that the oil forms the dielectric thereof. The capacitance of capacitor 35 is compared with the capacitance of a reference capacitor 36 which has dry oil forming the dielectric thereof. The measuring apparatus comprises a bridge network 37 which has resistors 38 and 39 connected in series relationship between first and second opposite terminals 40 and 41. The junction between resistors 38 and 39 is designated as terminal 42. A resistor 43, a potentiometer 44 and a resistor 45 are connected in series relationship between terminals 40 and 41. The contactor of potentiometer 44 is connected to ground. The secondary winding 46 of a transformer 47 is connected across bridge terminals 40 and 41. Capacitor 35 is connected between terminal 41 and ground, and capacitor 36 is connected between terminal 40 and ground. Variable adjusting capacitors 49 and 50 are connected in parallel with respective capacitors 35 and 36.

Transformer 47 is energized from the output of an oscillator 52. The first output terminal of oscillator 52 is connected to the control grid of a triode 53 through a capacitor 54 and a resistor 55 which are connected in series relationship. The cathode of triode 53 is connected to ground through series connected resistors 56 and 57. The junction between resistor 55 and capacitor 54 is connected to the junction between resistors 56 and 57 by a resistor 58. The anode of triode 53 is connected to a positive potential terminal 60 through a resistor 61. The junction between resistors 56 and 57 is connected through a capacitor 62 to one terminal of the primary winding 63 of transformer 47. The second terminal of transformer winding 63 is connected to ground.

Output terminal 42 of bridge network 37 is connected to the control grid of a pentode 64 through a resistor 65. The control grid of pentode 64 is connected to ground through a resistor 66. The cathode and suppressor grid of pentode 64 are connected to ground through a resistor 67. The anode of pentode 64 is connected to a positive potential terminal 68 through a resistor 70. A capacitor 71 is connected between terminal 68 and ground. The screen grid of pentode 64 is connected to terminal 68 through a resistor 72 and to ground through a capacitor 73. The anode of pentode 64 is also connected to the control grid of a pentode 74 through a capacitor 75. A resistor 76 is connected between the control grid of pentode 74 and ground. The cathode and suppressor grid of pentode 74 are connected to ground through a resistor 77. The screen grid of pentode 74 is connected to terminal 68 through a resistor 79 and to ground through a capacitor 80. The anode of pentode 74 is connected to terminal 68 through a resistor 82.

The anode of pentode 74 is also connected to the cathode of pentode 64 through a feedback network which comprises a capacitor 83 and a resistor 84 that are connected in series relationship. A variable capacitor 85 is connected in parallel with resistor 84 to change the phase of the feedback signal.

The anode of pentode 74 is connected to the control grid of a triode 90 through a capacitor 91. The cathode of triode 90 is connected to ground through series connected resistors 92 and 93. The control grid of triode 90 is connected to ground through series connected resistors 94 and 93. The anode of triode 90 is connected to terminal 68 through series connected resistors 95 and 96. A voltage regulating tube 97 is connected between ground and the junction between resistors 95 and 96, and a capacitor 98 is connected in parallel with this tube.

The anode of triode 90 is also connected to the control grid of a triode 100 through a capacitor 101. The junction between resistors 92 and 93 is connected to the control grid of a triode 102 through a capacitor 103. The control grids of triodes 100 and 102 are connected to ground through respective resistors 104 and 105. A null detecting meter 106 is connected between ground and the grid of triode 102 through a rectifier 107. The anodes of triodes 100 and 101 are connected to one another and to terminal 68 through resistor 96. The cathode of triode 100 is connected to the first end terminal of a potentiometer 108 through series connected resistors 109, 110 and 111. The cathode of triode 102 is connected to the second end terminal of potentiometer 108 through series connected resistors 112, 113 and 114. The contactor of potentiometer 108 is connected to ground. A resistor 115 is connected in parallel with potentiometer 108. The junction between resistors 110 and 111 is connected to the first input terminal of a recorder 116, and the junction between resistors 113 and 114 is connected to the second input terminal of recorder 116. The anode of triode 53 is connected to the cathodes of triodes 100 and 102 through respective capacitors 109a and 112a. A capacitor 110a is connected between ground and the junction between resistors 109 and 110, and a capacitor 113a is connected between ground and the junction between resistors 112 and 113.

The operation of the apparatus of FIGURE 2 will now be described. The output of oscillator 52 is applied through cathode follower 53 and transformer 47 across terminals 40 and 41 of bridge network 37. It should be evident that this network forms a capacity bridge. If the bridge is balanced there is a zero potential difference between terminal 42 and the grounded contactor of potentiometer 44. However, any unbalance of the bridge due to a change in capacitance of element 35 results in the potential at terminal 42 changing from ground potential. Also, any unbalance in the resistance arm including resistor 43, potentiometer 44 and resistor 45 or any change in the loss factor of the material in condenser 35 results in the potential at terminal 42 changing from ground potential. This latter potential is 90° out of phase with the potential due to a change in capacitance of condenser 35. This potential is applied to the grid of pentode 64. Any unbalance signal is amplified by pentodes 64 and 74 and applied to the control grid of triode 90. Triode 90 provides two output signals which are 180° out of phase with one another. These two signals are applied to the control grids of triodes 100 and 102, respectively. Triodes 100 and 102 and the associated circuit form a phase sensitive detector. A reference signal is applied to the cathodes of these tubes from the output of triode 53. The two signals applied to the phase detector network are thus of the same frequency because they are both obtained from oscillator 52. The currents through the two triodes are functions of the amplitudes of the signals applied to the control grids and the phases of these signals with respect to the reference signal applied to the cathodes. The resistors and capacitors in the cathode circuits of the two triodes filter the currents through the triodes. If the capacitance of capacitor 35 should become greater than that of capacitor 36, bridge network 37 is unbalanced in a first direction. If the capacitance of capacitor 35 becomes less than that of capacitor 36 the bridge is unbalanced in the opposite direction. The phase of the output signal from the bridge thus changes by 180° when the direction of the unbalance changes.

Bridge network 37 is balanced initially by varying one or both of capacitors 49 and 50 and potentiometer 44 until the recorder reads zero, or a predetermined value as determined by the setting of the contactor of potentiometer 108, when a reference material is disposed between the plates of capacitor 35. The contactor of potentiometer 44 alone is then moved to determine if the signal applied to recorder 116 changes. If a change is observed, capacitor 85 is varied to change the phase of the signal applied to the control grid of triode 90. Adjustment of capacitor 85 is continued to restore the recorder to the initial value. The contactor of potentiometer 44 is then adjusted until the reading of meter 106 is zero, which indicates that there is a zero potential difference between bridge terminal 42 and ground. At this final point, any further change of the position of the contactor of potentiometer 44 does not change the recorder reading. The bridge circuit is then balanced and the apparatus is ready to be operated. Any change in capacitance of capacitor 35 results in a change in the signal applied to recorder 116.

Capacitor 35 is connected to a terminal 120 which is adapted to be engaged by a switch 121. Switch 121 is connected to bridge terminal 41. A variable capacitor 122 is connected between ground and terminals 123 and 124. These two terminals are also adapted to be engaged selectively by switch 121. A variable capacitor 125 is connected between ground and a terminal 126. Terminal 126 is engaged by a switch 127 when terminal 123 is engaged by switch 121. Switch 127 is also connected to bridge terminal 41. The zero point of the capacitance bridge measuring circuit can be checked by moving switch 121 into engagement with terminal 124. This connects capacitor 122 into the measuring circuit in place of capacitor 35. Capacitor 122 is selected so that the output signal of the measuring circuit is zero if the circuit is operating properly. When switches 121 and 127 are moved into engagement with respective terminals 123 and 126, capacitor 125 is connected in parallel with capacitor 122. Capacitor 125 is selected so that the output signal of the bridge network has a predetermined value if the measuring circuit is operating properly.

Capacitors 35 and 36 are illustrated in FIGURE 3. The apparatus of FIGURE 3 comprises two pipes 130 and 131 which are joined by a union 132. An outlet pipe 133 is welded to the end of pipe 130, and an inlet pipe 134 is welded to the opposite end of pipe 131. The oil circulated through conduit 27 of FIGURE 1 enters the apparatus of FIGURE 3 through pipe 134 and is removed through pipe 133. A metal sleeve 135 is mounted within pipe 130.

Sleeve 135 and pipe 130 thus form the two plates of capacitor 35 and the oil therebetween forms the dielectric of the capacitor. A plug 136 is welded to the first end of sleeve 135, and an insulated guide member 137 is threaded to plug 136. Guide member 137 extends into a spider 138 which is disposed within pipe 130. A plug 139 is welded to the second end of sleeve 135. Plug 139 is attached to a spool 140 by means of a plurality of screws 141 which extend through insulated bushings 142. An insulating disk 143 is disposed between plug 139 and spool 140.

The second end of spool 140 is attached to an end plate 144 by a plurality of screws 145. End plate 144 is attached to pipe 130 by means of a flange 147 which is welded to pipe 130 and secured to end plate 144 by a plurality of bolts 148. A plurality of guide pins 149 extend between end plate 144 and flange 147 to insure proper alignment. A rod 150 is threaded to plug 139 and extends outwardly through spool 140 and a central opening in end plate 144. A conduit 151 is threaded into end plate 144 to enclose rod 150. An insulating guide sleeve 152 encloses rod 150 within sleeve 140. Rod 150 is connected by an electrical lead, not shown, to terminal 120 of FIGURE 2. Pipe 130 is connected to ground. It should be evident that the capacitance cell can readily be removed from pipe 130 for cleaning when necessary. This is accomplished merely by removing plate 144 and withdrawing the cell structure.

A metal housing 160 is positioned within pipe 131 so as to be in thermal contact with the oil flowing therethrough. A metal plug 161 is disposed within housing 160. The region between plug 161 and housing 160 is filled with a dry oil to form the dielectric between plug 161 and housing 160 which constitute the two plates of capacitor 36. The first end of plug 161 is attached to an insulating cap 162 by means of a screw 163. Cap 162 positions plug 161 centrally within housing 160. Housing 160 is attached to a body member 164 by a plurality of screws, not shown. Body member 164 is attached to a sleeve 165 by a plurality of screws 166. Sleeve 165 is welded to pipe 131. A threaded rod 167 is attached to the second end of plug 161 and retained in place by a lock nut 168. Rod 167 extends through a nipple 170 which is threaded to body member 164. An insulating sleeve 171 is carried by body member 164 and in turn carries a plug 172 through which rod 167 is threaded. Insulating sleeve 173 encloses rod 167 within nipple 170. Rod 167 is connected by an electrical lead, not shown, to terminal 40 of FIGURE 2. Housing 160 is connected to ground.

Body member 164 is provided with filling ports 175 and 176. These ports communicate with the annular region between plug 161 and housing 160 by means of respective passages 177 and 178. These ports permit the interior of housing 160 to be filled with a dry oil which has a composition approximately the same as the oil being measured. The reference capacitor assembly 36 is constructed so as to have an active capacitance approximately equal to the capacitance of assembly 35. The exact balance can be made by rotating rod 167 in plug 172, thereby moving plug 161 inwardly or outwardly to change the effective capacitance. Any change in temperature of the oil stream being monitored thus changes the active capacitances of the two assemblies in the same manner so as to eliminate errors due to temperature changes. Elements 130, 131, 135 and 160 are provided with respective coatings 130a, 131a, 135a and 160a of a plastic material, such as polyurethane, polyethylene or Teflon (polymerized tetrafluoroethylene), to prevent paraffin build-up on these elements.

The output signal from the measuring circuit of FIGURE 2 energizes the control circuit of FIGURE 4. Terminals 117 and 118 of FIGURE 2 are connected to the respective end terminals of the coil 180 of a relay 181. Relay 181 is provided with a rotatable arm 182 which engages a first stationary contact 183 in a first position and a second stationary contact 184 in a second position. When the B.S. and W. content of the oil stream exceeds a predetermined value, the signal applied to coil 180 moves arm 182 into engagement with contact 183. Contact 183 is connected to a potential terminal 185 through a relay coil 186. A capacitor 187 is connected in parallel with relay coil 186. Arm 182 of relay 181 is connected to ground through a latching coil 188 and a switch 189. When arm 182 engages contact 183, relay coil 186 is energized to close a switch 190 and latching coil 188 is energized to retain arm 182 in this position. Switch 190 is connected between a potential terminal 192 and the first terminal of a relay coil 193. The second terminal of relay coil 193 is connected to ground. When relay coil 193 is energized, switches 195 and 196 are closed and switches 197 and 198 are opened. Pumps 25 and 31 of FIGURE 1 are connected to a source of electrical energy 199 through respective switches 197 and 195. As previously mentioned, when the measured water content exceeds a predetermined value, switch 195 is closed and switch 197 is opened. This stops pump 25 and starts pump 31.

Valves 26 and 32 are opened when respective solenoids 26' and 32' are energized. These solenoids are connected to source 199 through respective switches 198 and 196. Valve 26 is thus closed when pump 25 is stopped, and valve 32 is opened when pump 31 is started.

Switch 189 is controlled by a cam 201 which is rotated by a constant speed motor 202, the latter being energized by a source of current 203. Cam 201 is designed so that switch 189 is opened momentarily, three seconds for example, at the end of predetermined intervals, such as 15 seconds, for example. If the measured B.S. and W. content still exceeds the predetermined set value at the time switch 189 is opened, arm 182 remains in engagement with contact 183. If the measured B.S. and W. content is within accepted limits, the opening of switch 189 permits arm 182 to move out of engagement with contact 183 because holding coil 188 is de-energized. Capacitor 187 provides current to retain relay 186 closed during the interval that switch 189 is open. Relay 193 is provided with a time delay in closing, 30 seconds for example. This prevents the control circuit from operating in the event the measured B.S. and W. content exceeds the set value for only a few seconds.

Contact 184 is connected to a potential terminal 205 through a relay coil 206. A capacitor 207 is connected in parallel with relay coil 206. Relay coil 206 closes a switch 208 when energized. Switch 208 is connected in parallel with switch 190. If the electronic measuring circuit should fail for any reason, the signal applied to coil 180 is such as to move switch arm 182 into engagement with contact 184. This is a "fail-safe" circuit and operates to prevent oil from being delivered to the pipeline in the event the monitor fails to operate properly. A pulse counter 210 is connected in parallel with relay coil 193 so as to be energized each time relay 133 is energized. This provides the operator with an indication of how effectively treater 12 is operating.

From the foregoing description it should be apparent that there is provided in accordance with this invention an improved system for measuring the B.S. and W. concentration in oil and for controlling the delivery of such oil to a pipeline so as to maintain the B.S. and W. concentration in the delivered oil less than a predetermined value. This apparatus permits a crude oil custody transfer unit to operate automatically. The apparatus of this invention includes a novel B.S. and W. monitoring circuit which employs an electrical condenser as the measuring probe.

While the invention has been described in conjunction with a present preferred embodiment, it should be evident that it is not limited thereto.

What is claimed is:

1. An oil transfer system comprising a first vessel for treating oil to remove B.S. and W. therefrom, a second vessel to receive the treated oil, first conduit means communicating between said first vessel and said second vessel to transfer oil from said first vessel to said second vessel, second conduit means communicating with said second vessel to remove oil therefrom, a first valve in said second conduit means, third conduit means communicating between said second vessel and said first vessel to return oil to said first vessel, a second valve in said third conduit means, fourth conduit means communicating between a first region within said second vessel and a second region therein to continuously withdraw and subsequently return a sample of oil, means disposed in said fourth conduit means to establish an electrical signal representative of the B.S. and W. content of the oil sample, a relay, means to apply said electrical signal to said relay so that said relay is actuated when said electrical signal exceeds a predetermined value, and means responsive to said relay being actuated to close said first valve and open said second valve.

2. An oil transfer system comprising a first vessel for treating oil to remove B.S. and W. therefrom; a second vessel to receive the treated oil; first conduit means communicating between said first vessel and said second vessel to transfer oil from said first vessel to said second vessel; second conduit means communicating with said second vessel to remove oil therefrom; a first valve in said second conduit means; third conduit means communicating between said second vessel and said first vessel to return oil to said first vessel; a second valve in said third conduit means; fourth conduit means communicating between a first region within said second vessel and a second region therein to withdraw and subsequently return a sample of oil; means disposed in said fourth conduit means to establish an electrical signal representative of the B.S. and W. content of the oil sample; a first relay having a holding coil therein; a second relay; a normally closed switch; a source of current; means connecting said source of current in series relationship with said switch, said holding coil, the contacts of said first relay and the coil of said second relay; means to apply said electrical signal to the coil of said first relay so that the contacts of said first relay are closed and said second relay is energized when said electrical signal exceeds a predetermined value, said switch being closed; a capacitor connected in parallel with the coil of said second relay; means to open said switch periodically for first predetermined time intervals; and means responsive to said second relay being actuated to close said first valve and open said second valve following a second predetermined time interval which is greater than said first predetermined time intervals.

3. The system of claim 2 further comprising a first pump in said second conduit means, a second pump in said third conduit means, and means responsive to said second relay being actuated to de-energize said first pump and energize said second pump.

4. The system of claim 2 wherein said means to establish an electrical signal comprises a capacitor positioned so that the fluid passed through said fourth conduit means forms the dielectric thereof, and means to establish an electrical signal representative of the capacitance of said capacitor.

5. The system of claim 4 wherein said capacitor comprises a cylindrical metal conduit forming a part of said fourth conduit means, a metal cylinder of external diameter smaller than the internal diameter of said conduit, and means positioning said cylinder concentrically within and insulated from said conduit so that said conduit and said cylinder form the plates of said capacitor and the fluid in said third conduit means forms the dielectric.

6. The system of claim 5 further comprising a coating of an electrically insulating material on said cylinder and a coating of an electrically insulating material on the inner wall of said conduit.

7. The system of claim 4 further comprising a second capacitor having a reference fluid forming the dielectric thereof, a bridge network having said first-mentioned and said second capacitors in adjacent arms thereof, means to apply an alternating potential across first opposite terminals of said bridge network, and means connected across second opposite terminals of said bridge network to establish said electrical signal as a function of the difference between the capacitances of said capacitors.

8. The system of claim 7 wherein said first-mentioned capacitor comprises a cylindrical metal conduit forming a part of said fourth conduit means, a first metal cylinder of external diameter smaller than the internal diameter of said conduit, and means positioning said first cylinder concentrically within and insulated from said conduit so that said conduit and said first cylinder form the plates of said first-mentioned capacitor and the fluid in said third conduit means forms the dielectric; and wherein said second capacitor comprises a second hollow metal cylinder of external diameter smaller than the internal diameter of said conduit, means positioning said second cylinder within said conduit, a third metal cylinder of external diameter smaller than the internal diameter of said second cylinder, and means positioning said third cylinder concentrically within and insulated from said second cylinder so that said second and third cylinders form the plates of said second capacitor, said reference fluid being disposed between said second and third cylinders to form the dielectric of said second capacitor.

9. The sytem of claim 8 further comprising coatings of electrically insulating material on the inner wall of said conduit, the outside of said first cylinder and the outside of said second cylinder.

References Cited in the file of this patent

UNITED STATES PATENTS

| | | |
|---|---|---|
| 2,623,928 | Bower | Dec. 30, 1952 |
| 2,654,067 | Bruce | Sept. 29, 1953 |
| 2,773,556 | Meyers et al. | Dec. 11, 1956 |